(12) United States Patent
Weber

(10) Patent No.: US 6,285,494 B1
(45) Date of Patent: Sep. 4, 2001

(54) AMPLIFYING OPTICAL FIBER AND METHOD OF PRODUCING IT

(75) Inventor: Dieter Weber, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/092,410

(22) Filed: Jun. 5, 1998

(30) Foreign Application Priority Data

Jun. 6, 1997 (DE) ............................................. 197 23 833

(51) Int. Cl.[7] ...................................................... H01S 3/067
(52) U.S. Cl. ........................ 359/343; 359/341.1; 372/40
(58) Field of Search ................................... 359/341, 343; 385/142; 372/40

(56) References Cited

U.S. PATENT DOCUMENTS

| | | |
|---|---|---|
| 4,224,046 | 9/1980 | Izawa et al. . |
| 4,826,288 | 5/1989 | Mansfield et al. .................... 350/320 |
| 5,490,010 | 2/1996 | Sharma et al. . |
| 5,554,747 | 9/1996 | Sharma et al. . |
| 5,581,398 | 12/1996 | van Veggel et al. . |
| 5,710,852 | 1/1998 | Weber . |

FOREIGN PATENT DOCUMENTS

| | | |
|---|---|---|
| 2835326 | 11/1982 | (DE) . |
| 4028821 | 3/1992 | (DE) . |
| 4215707 | 11/1992 | (DE) . |
| 4209004 | * 9/1993 | (DE) . |
| 4306933 | 9/1994 | (DE) . |
| 4444844 | 6/1995 | (DE) . |
| 4420287 | * 12/1995 | (DE) . |
| 0134480 | 11/1987 | (EP) . |
| 0286626 | 10/1988 | (EP) . |
| 0523692 | 1/1993 | (EP) . |
| 0536410 | 4/1993 | (EP) . |
| 0633229 | 1/1995 | (EP) . |
| 0672628 | 9/1995 | (EP) . |
| 691715 | * 1/1996 | (EP) . |
| 1353708 | 1/1964 | (FR) . |
| 2303129 | 2/1997 | (GB) . |
| 93/17449 | * 9/1993 | (WO) . |
| 94/21010 | * 9/1994 | (WO) . |

OTHER PUBLICATIONS

"Aerosol doped Nd planar silica waveguide laser" by J. Bonar, et al, Electronics Letters, Jan. 19, 1995, vol. 31, No. 2 pp. 99–100.
Patent Abstracts of Japan 07247131 A Sep. 26, 1995.
"A Review of the Fabrication and Properties of Erbium–Doped Fibers for Optical Amplifiers", B. J. Ainslie, *Journal of Lightwave Technology*, vol. 9, No. 2, Feb. 1991, pp. 220–227.
"Aerosol Doped Nd Planar Silica Waveguide Laser", J. Bonar et al, *Electronics Letters*, vol. 31, No. 2, Jan. 19, 1995, pp. 99–100.
"Manufacture of Rare Earth–Doped Quartz Glass", N. Edakawa et al, *Chemical Abstracts*, 119: 54620w, Aug. 9, 1993, No. 6.
Patent Abstracts of Japan No. 06183751, pub. Jul. 5, 1994 for Japanese Patent Application 04–340075, Dec. 21, 1992.
Patent Abstracts of Japan No. 60239330, pub. Nov. 28, 1985 for Japanese Patent Application 59–093536, May 10, 1984.

* cited by examiner

*Primary Examiner*—Nelson Moskowitz
(74) *Attorney, Agent, or Firm*—Ware, Fressola, Van Der Sluys & Adolphson LLP

(57) ABSTRACT

An amplifying optical fiber is proposed (particularly for the 1300 nm wavelength range) whereby a high amplification can be achieved with the smallest possible pumping power. Agglomerates comprising a number of complexes are incorporated into the core of the amplifying optical fiber. The complexes are composed of a rare-earth element and a separator substance.

10 Claims, 3 Drawing Sheets

AMPLIFYING OPTICAL FIBER AND METHOD OF PRODUCING IT

BACKGROUND OF THE INVENTION

1. Technical Field

The invention concerns an amplifying optical fiber, comprising an optical fiber core and an optical fiber sheath, where most of the volume of the optical fiber core is made of a material with good transmission properties, and in which, as amplification material, complexes composed of rare-earth ions sheathed with a separator substance, are statistically distributed.

2. Discussion of Related Art

Such an amplifying optical fiber and a method for its production is known from my German application DE 44 20 287 and its corresponding U.S. Pat. No. 5,710,852 which is hereby incorporated by reference in its entirety for background. In the first place the known amplifying optical fiber is one in which the amplification of the light takes place in the 1550 nm wavelength range. Such amplifying optical fibers exhibit a favorable relationship between the pumping power and the amplification. For example, if the core of the amplifying optical fiber is doped with erbium, a pumping power of 30 mW can achieve a 40 dB amplification.

To obtain the same result with an amplifying optical fiber in the 1330 nm wavelength range, where the core is doped with praseodymium for example, a pumping power of 500 mW is required.

SUMMARY OF INVENTION

The technical problem, to which the invention is directed, is therefore to create an amplifying optical fiber which can achieve the highest possible amplification with the smallest possible pumping power. This applies basically to all types of amplifying optical fibers, i.e., both fibrous optical waveguides as well as planar optical conductors arranged on a substrate, and for all imaginable wavelength ranges. Since the production of amplifying optical fibers with sufficient amplification in the 1330 nm wavelength range is greatly desired, such a one is proposed whereby a sufficient amplification requires a pumping power that is well under 100 mW. In the amplifying optical fibers to be created, the likelihood, that a portion of the light power generated by the pumping laser, will be absorbed by the phonons of the host lattice, should be eliminated or very sharply reduced.

The invention solves this technical problem in that the amplification material is composed of amorphous agglomerates from a number of complexes. By this measure it is achieved that as large a number of rare-earth ions as possible is included in the core of the amplifying optical fiber, so that a given pumping power optimally excites the latter into stimulated emission, and a coherent light amplification is achieved.

These and other objects, features and advantages of the present invention will become more apparent in light of the following detailed description of a best mode embodiment thereof, as illustrated in the accompanying drawing.

DETAILED DESCRIPTION OF PREFERRED EMBODIMENTS

Figure 1:
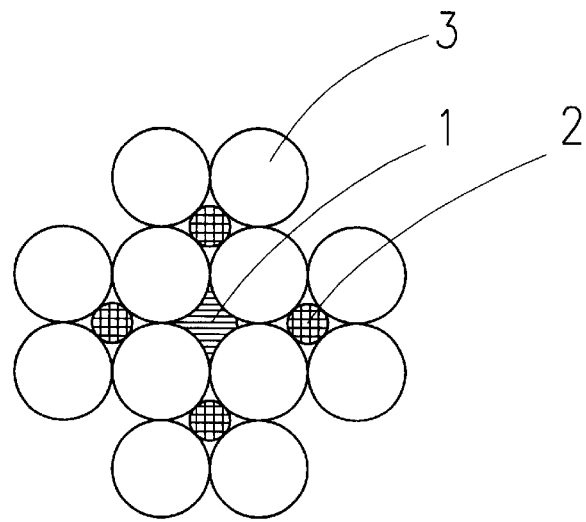
FIG. 1 is a two-dimensional illustration of the complex.

The complex shown in FIG. 1 comprises the rare-earth ion 1 in the center, which is surrounded by a separator substance. The latter has the function of optically isolating the rare-earth ions from each other. If the complex is built into an amplifying optical fiber core, the rare-earth ion is an erbium ion for example. The separator substance was created from aluminum fluoride ($AlF_3$) for example, so that the rare-earth ion 1 is surrounded by aluminum ions 2 and fluorine ions 3. The separator substance is not restricted to $AlF_3$ however and could be any other suitable substance such as a lanthanum compound.

Figure 2:
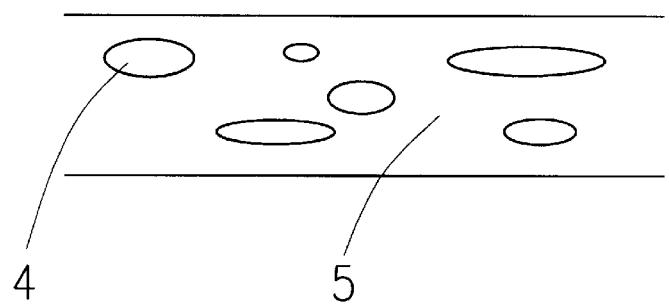
FIG. 2 is a schematic illustration of a section of an amplifying optical fiber with agglomerates.

In accordance with the invention, agglomerates 4 or lumps are now formed from a number of these complexes, for example from several thousand complexes, which are nonuniformly, i.e., statistically distributed in the material of the amplifying optical fiber core 5, as can be seen in FIG. 2. Such an agglomerate for example comprises more than a thousand individual molecules and has a diameter of several hundred nanometers or more or more generally, between $10^{-9}$ and $10^{-6}$ m. The material of the core 5 can be the ordinary material used for optical fibers, such as silica ($SiO_2$) for example, whose index of refraction has been adapted by doping with another material, germanium dioxide ($GeO_2$) for example. However other materials can basically also be used as core material.

Figure 3:
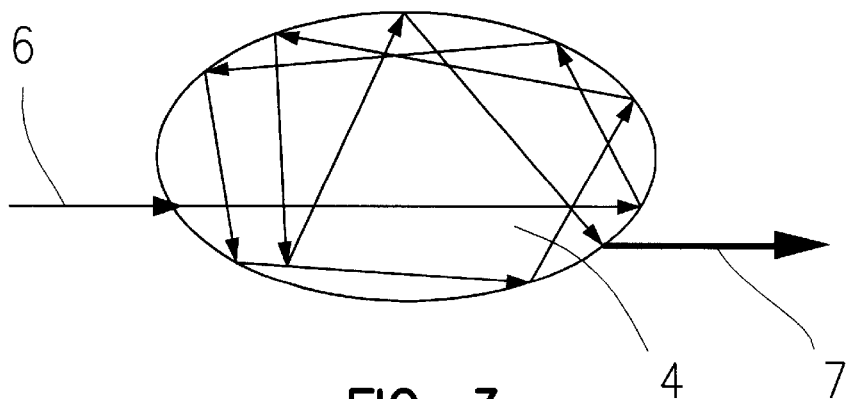
FIG. 3 is a schematic illustration of an agglomerate.

FIG. 3, schematically illustrates an agglomerate 4 and is used to explain the amplifying effect on the light passing through the amplifying optical fiber core, when the rare-earth ions of the complexes in the agglomerate 4 are excited by a pumping laser. The light 6 penetrating the agglomerate 4 is reflected multiple times and can therefore be amplified multiple times when it passes through several complexes. The amplified light 7 can pass successively through several agglomerates 4 in the pumped amplifying optical fiber core 5, where it is amplified once again. The result is an altogether higher amplification than with the known amplifying optical fibers. The rare-earth ions are composed of elements which correspond to the range of wavelengths to be amplified, such as erbium, neodymium or praseodymium.

If the core material and the agglomerates are amorphous, the value of the wavelength width of the amplified light is optimal.

Figure 4:
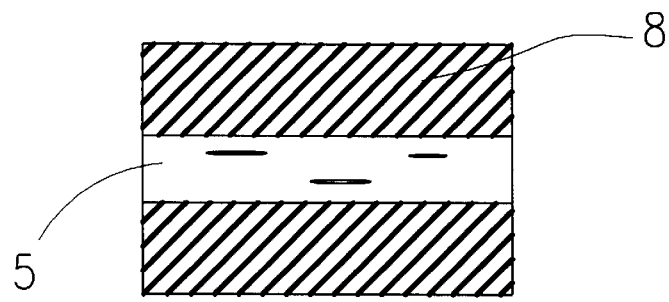
FIG. 4 is a section of an amplifying optical fiber with a core as illustrated in FIG. 2.

FIG. 4 shows a sectional view of an amplifying optical fiber which has a core 5 with agglomerates 4 according to FIG. 2. The core 5 is surrounded by the optical fiber sheath or cladding 8 which, as is usually the case with optical fibers, is composed of a material with an index of refraction which is lower than that of the core 5. In the case of the refraction indexes of the transmission material and the amplification material, they can be different as well, e.g., a difference on the order of about $40 \times 10^{-3}$.

The amplifying optical fiber according to FIG. 4 can be a filamentary or a planar optical fiber. In a filamentary optical fiber, the sheath 8 concentrically surrounds the core 5. In a planar optical fiber, the sheath 8 is composed of planar layers on both sides of the strip-shaped core 5 for example.

Figure 5:
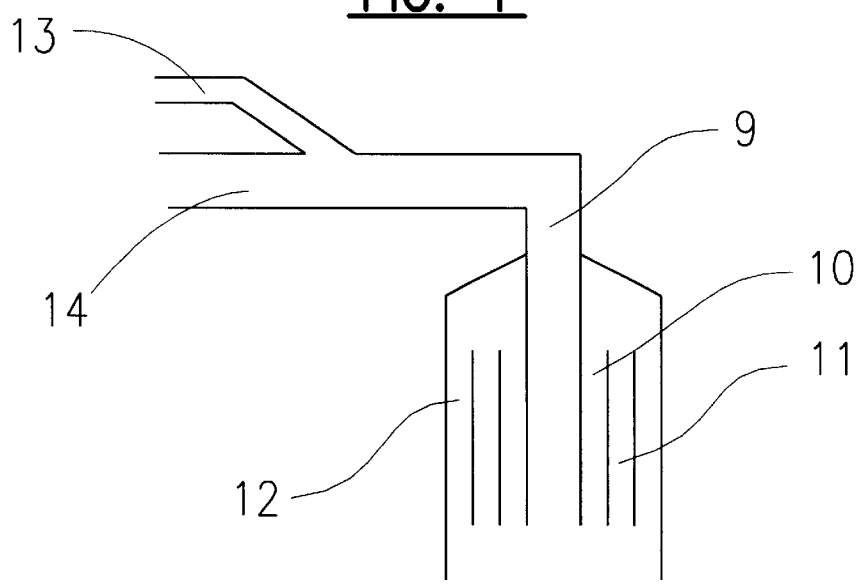
FIG. 5 schematically illustrates a device for producing an amplifying optical fiber core which contains agglomerates.

FIG. 5 illustrates the configuration of a device that is able to produce an optical fiber core with agglomerates. It contains a known oxyhydrogen burner whereby layers of glass or porous glass layers can be produced in accordance with the flame hydrolysis method.

Such devices are known from U.S. Pat. No. 4,224,046 which is hereby incorporated by reference in its entirety for background. They comprise several concentrically arranged tubes, where the material from which the glass layer will be produced, is supplied to the burner, in which the tube 9 is located in the center. As a rule, oxygen is supplied through tube 10 and hydrogen through tube 11. Tube 12 conducts an inert gas, for example argon, which has several functions, for example to shield the stream of burner gases on the outside, and to cool it.

In the device that can be seen in FIG. 5, the tube 9 is supplied from the two tubes 13 and 14. Tube 13 for example supplies the raw materials for the core glass in gaseous form, for example silicon tetrachloride and germanium tetrachloride in conjunction with argon. Tube 14 supplies the raw materials for the production of the agglomerates.

There are two possibilities of supplying the agglomerate materials. In one instance the materials from which the complexes are created, i.e., the rare-earth material and the separator material, are supplied in gaseous form in conjunction with a gas such as argon. However the complexes or the agglomerates can also be supplied to the burner as a fine powder in a gas stream, which is also composed of argon.

Figure 6:
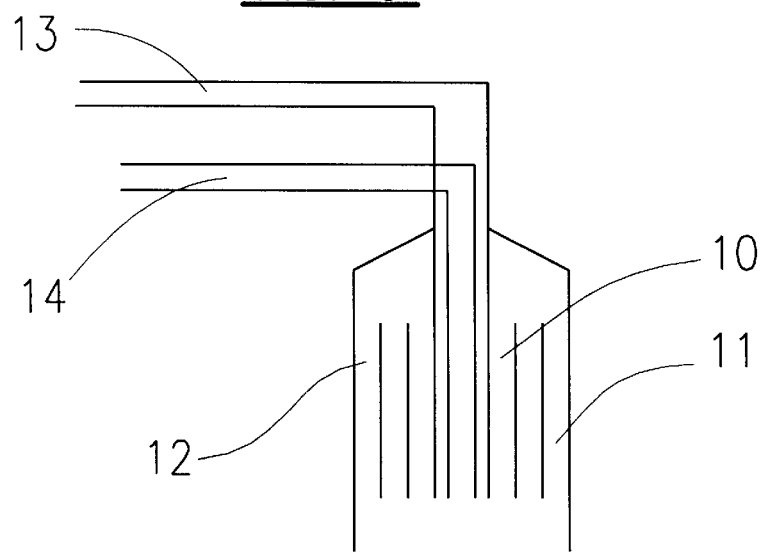
FIG. 6 schematically illustrates another device for producing an amplifying optical fiber core which contains agglomerates.

The device illustrated in FIG. 6 differs from the device in FIG. 5 in that the tubes 13 and 14 are routed in a coaxial manner to the oxyhydrogen burner. The components of the device, which are identical to the components of the device in FIG. 5, have the same reference numerals.

Figure 7:
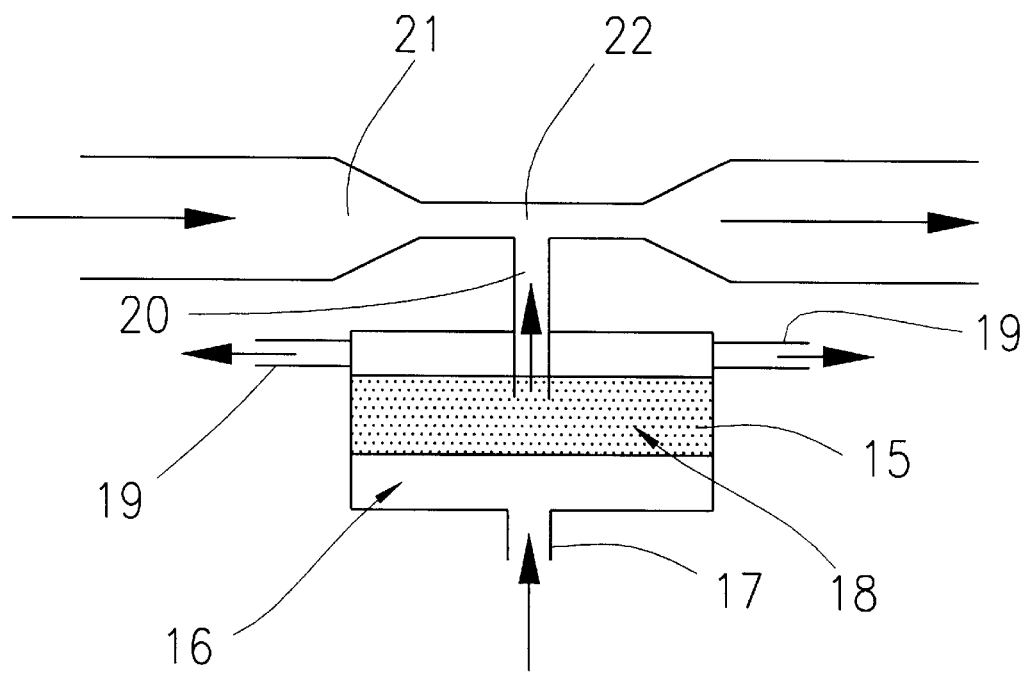
FIG. 7 schematically illustrates a device for producing a powder-gas mixture, and FIG. 8 schematically illustrates a device for producing a gas mixture which contains rare-earth ions.

FIG. 7 illustrates a device which is suitable for producing a fluid from a fine powder (d<0.2 $\mu$m), and the fluid can be supplied to the oxyhydrogen burner in conjunction with a gas stream. The device comprises a container 15 in which the powder material is located on a gas-permeable bottom 16. The underside of the container 15 is equipped with a tube connection 17 through which a gas is supplied. This gas permeates the powder layer 18 in the container 16 and is exhausted through the gas outlets 19. A tube 20, which ends in the tube 21, dips into the powder layer 18 and conducts the gas stream, whereby the powder-gas mixture is supplied to the oxyhydrogen burner.

A negative pressure exists in the narrow section 22 of tube 21, which causes parts of the fluid in the container 15 to be drawn into the gas stream in tube 21 where they are transported.

Figure 8:
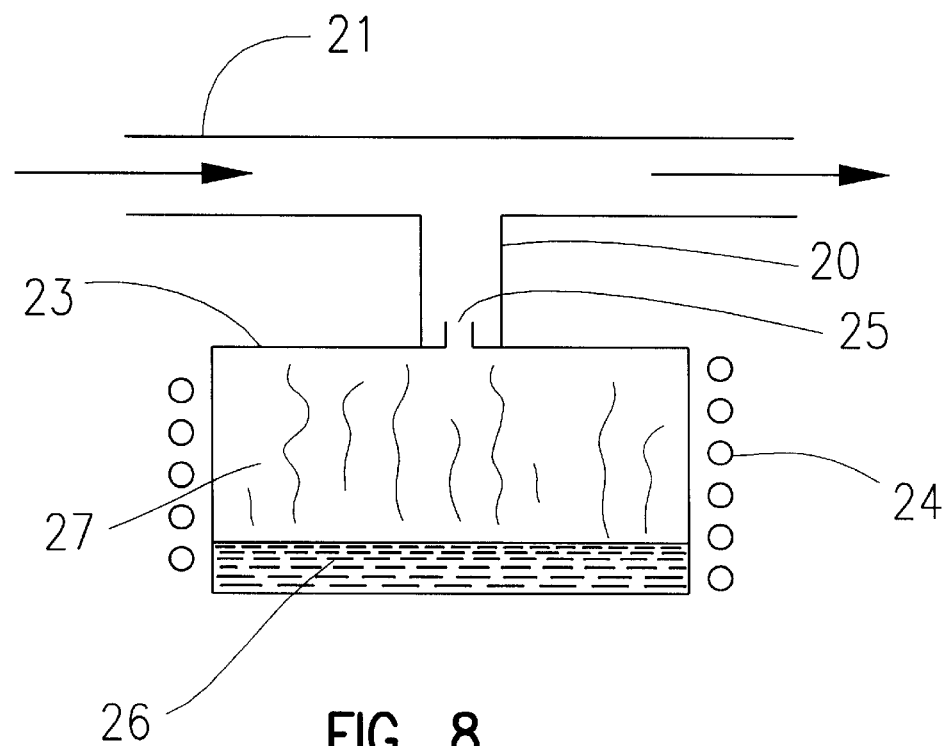

FIG. 8 illustrates a device whereby the raw materials of the agglomerates can be produced in gaseous form, so that they can be glass-encapsulated together with the raw materials of the optical fiber core during its production. This device comprises a pressure-resistant container 23 which is equipped with a heater 24. The top of the container 23 has a very small opening 25 which ends in a tube 20. The tube 20 in turn ends in the tube 21. Tubes 20 and 21 correspond to those of the device in FIG. 7. The raw materials for the production of the complexes or the agglomerates are placed on the bottom of container 23. The device in FIG. 8 is a so-called Knudsen cell, which is also described in DE-A-42 09 004.

The gaseous materials for the complexes or the agglomerates are produced in the following manner: the materials in the container 23 are for example erbium chloride and aluminum chloride. When the container 23 is heated to a temperature of about 800° C. for example, the easily volatile aluminum produces a high pressure. The gas 27, with the erbium chloride/aluminum chloride composition, is located above the mixture of solid materials 26 and can escape through the very small opening 25 which has a diameter of about 100 to 200 $\mu$m. Depending on the size of the opening 25, agglomerates of a hundred or more individual molecules are created. The agglomerates are carried along by the gas stream in the tube and are transported to the vitrification area of the core glass material, where they are incorporated into the core glass.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. An amplifying optical fiber comprising an optical fiber core and an optical fiber sheath, where more than half of the volume of the optical fiber core is made of a material adapted to transmit radiation in a wavelength band of radiation intended to be transmitted along said optical fiber, and where amplifier material of the amplifying optical fiber comprises statistically distributed complexes of rare-earth ions, selected from the group consisting of erbium, neodymium and praseodymium, which are sheathed by a trifluoride separator substance, said amplifier material being adapted to amplify radiation in said wavelength band, wherein the amplifier material comprises amorphous agglomerates from a plurality of complexes, thereby achieving a 40 dB amplification in a 1330 nm wavelength range with a required pumping power of less than 100 mW.

2. An amplifying optical fiber as claimed in claim 1, characterized in that the agglomerate contains more than one thousand individual molecules and has a diameter which is between $10^{-9}$ and $10^{-6}$ m.

3. An amplifying optical fiber as claimed in claim 1, characterized in that the rare-earth ions are composed of elements which correspond to the range of wavelengths to be amplified, such as erbium, neodymium or praseodymium.

4. An amplifying optical fiber as claimed in claim 1, characterized in that the separator substance is a lanthanum compound.

5. An amplifying optical fiber as claimed in claim 1, characterized in that the difference between the refraction indexes of the transmission material and the amplification material is about $40 \times 10_{-3}$.

6. An amplifying optical fiber as claimed in claim 2, characterized in that the separator substance is an aluminum compound.

7. An amplifying optical fiber as claimed in claim 2, characterized in that the separator substance is a lanthanum compound.

8. An amplifying optical fiber as claimed in claim 2, characterized in that the difference between the refraction indexes of the transmission material and the amplification material is about $40 \times 10^{-3}$.

9. An amplifying optical fiber as claimed in claim 2, characterized in that the difference between the refraction indexes of the transmission material and the amplification material is about $40 \times 10_{-3}$.

10. An amplifying optical fiber as claimed in claim 2, characterized in that the rare-earth ions are composed of elements which correspond to the range of wavelengths to be amplified, such as erbium, neodymium or praseodymium.

\* \* \* \* \*